US007692911B2

(12) United States Patent
Hartmann et al.

(10) Patent No.: US 7,692,911 B2

(45) Date of Patent: Apr. 6, 2010

(54) ARRANGEMENT FOR PROTECTION OF ELECTRONIC COMPONENTS

(75) Inventors: Werner Hartmann, Weisendorf (DE); Michael Römheld, Uttenreuth (DE)

(73) Assignee: Siemens Aktiengesellschaft, Munich (DE)

( * ) Notice: Subject to any disclaimer, the term of this patent is extended or adjusted under 35 U.S.C. 154(b) by 262 days.

(21) Appl. No.: 11/663,775

(22) PCT Filed: Sep. 21, 2005

(86) PCT No.: PCT/EP2005/054726

§ 371 (c)(1), (2), (4) Date: Mar. 26, 2007

(87) PCT Pub. No.: WO2006/032677

PCT Pub. Date: Mar. 30, 2006

(65) Prior Publication Data

US 2008/0130184 A1 Jun. 5, 2008

(30) Foreign Application Priority Data

Sep. 24, 2004 (DE) ...................... 10 2004 046 442

(51) Int. Cl.
*H02H 9/00* (2006.01)

(52) U.S. Cl. ...................................... 361/93.7; 361/19

(58) Field of Classification Search ................... 361/19, 361/103, 104, 106, 93.7
See application file for complete search history.

(56) References Cited

U.S. PATENT DOCUMENTS 1,972,112 A 9/1934 Rypinski
2,556,235 A 6/1951 Strickland, Jr.
3,176,217 A 3/1965 Matsushima et al.
3,849,670 A 11/1974 Lourigan
4,079,324 A 3/1978 Chesnel
4,812,796 A * 3/1989 Ries ........................... 335/299
5,844,467 A 12/1998 Shea
6,166,619 A * 12/2000 Baiatu et al. .................. 338/61
6,275,365 B1 * 8/2001 Kalsi et al. .................... 361/19

FOREIGN PATENT DOCUMENTS

| | | |
|---|---|---|
| DE | 26 07 883 | 9/1976 |
| DE | 38 15 676 A1 | 11/1989 |
| DE | 103 05 069 A1 | 1/2004 |
| EP | 0 933 980 A3 | 8/1999 |
| GB | 1 470 902 | 4/1977 |
| WO | 89/11155 | 11/1989 |

OTHER PUBLICATIONS

International Search Report for Application No. PCT/EP2005/054726; mailed Dec. 16, 2005.
German Patent Office Action issued Jul. 13, 2005 in priority German Patent Application No. 10 2004 046 442.1-34.
German Patent Office Action issued Jul. 13, 2005 in priority German Patent Application No. 10 2004 046 442.1.

* cited by examiner

*Primary Examiner*—Danny Nguyen
(74) *Attorney, Agent, or Firm*—Staas & Halsey LLP

(57) ABSTRACT

In devices for producing strong current high power impulses, the electronic components, which include passive components including capacitors and/or switch elements, including semi-conductor switches, diodes or similar elements, need to be protected against overcurrents in the event of an error function. Generally, serial resistance and serial inductance are used. The serial resistance and the serial inductance are combined together in such a manner that a coil having necessary resistance and inductance values is produced.

6 Claims, 2 Drawing Sheets

ARRANGEMENT FOR PROTECTION OF ELECTRONIC COMPONENTS

CROSS REFERENCE TO RELATED APPLICATIONS

This application is based on and hereby claims priority to German Application No. 10 2004 046 442.1 filed on Sep. 24, 2004, the contents of which are hereby incorporated by reference.

BACKGROUND

Described below is an arrangement for protection of electronic components, in particular in appliances for production of high-current, high-power pulses.

Electronic components in appliances for production of high-current, high-power pulses, in particular passive components such as capacitors, and switching elements such as semiconductor switches (thyristors, IGBTs, IGCT/IGETs, etc.), diodes, etc. generally have to be protected against overcurrents in the event of a malfunction (short circuit, flashover) since they have only a restricted surge capacity and their life is greatly reduced if the permissible values are exceeded, or these components are even irreversibly damaged.

Until now, this problem has been solved either by using fuse links, although these often react with too much inertia in the event of short pulse times, or the components are protected by a series circuit of individual resistances and/or inductances, so that the maximum possible short-circuit current in the event of a fault does not exceed the maximum permissible limit values of the components. Low-loss inductances, possibly in series with separate resistances, are used for this purpose, with the resistances being of such a magnitude that they absorb the energy that is stored in the appliance without being unacceptably heated.

SUMMARY

Against the above background, an aspect is to provide an improved arrangement for protection of electronic components.

According to the novel problem solution, the limited components, specifically "series resistance" and "series inductance", are combined in a single component so as to produce a coil which is provided with the required series impedance. Appropriate choice of material for this coil—characterized by the thermal capacity and the electrical resistivity—makes it possible on the one hand to absorb the required amount of energy without on the other hand causing unacceptably severe heating. Some types of stainless steel, in particular, may be used as materials for this purpose.

In one advantageous embodiment, the inductance, which has resistance, is provided by a thin-walled tube or thin strip composed of a metallic material of low conductivity being wound to form a cylindrical or spiral (flat) coil. The conductivity of the tube diameter and the strip width, the tube/strip length and the material thickness are in this case chosen such that the necessary resistance is achieved for the required energy absorption, and the maximum permissible heating is not exceeded. The conductor length associated with this is wound up to form a coil which corresponds to the required inductance, with the characteristic coil data such as the number of turns, the diameter, the coil length necessary being produced, and if required being optimized by iterative calculation of all of the variables.

If required, the conductor material used can be changed to ensure that a suitable combination of conductivity and specific heat match the other required variables. Particularly when using a thin-walled tube to form the coil winding, the thermal capacity of this tube can be increased by filling it with an only slightly conductive or insulating liquid, or allowing such a liquid to flow through it. Fillings with a suitable powder may be sufficient.

It is particularly advantageous for the material of the coil winding not only to have a high resistivity but also to have a high temperature coefficient. In consequence, the resistance is heated to a major extent in the event of a short circuit, as a result of which the heating resistance then becomes particularly high, leading to major limiting of the short-circuit current, and thus to very effective protection of the component or components to be protected. The cold resistance in this embodiment is minimal, thus leading to a very energy-efficient circuit during normal operation. Iron alloys, such as the already mentioned steel, are particularly highly suitable as a coil material for this purpose, in particular non-magnetic, high-alloyed stainless steels.

If the RL combination is subjected to high currents, the magnetic forces which act in this case ensure good mechanical fixing of the coil turns, for example on a coil core composed of insulating and heat-resistant material.

BRIEF DESCRIPTION OF THE DRAWINGS

These and other objects and advantages will become evident and more readily appreciated from the following description of exemplary embodiments, taken in conjunction with reference to the accompanying drawings of which.

DETAILED DESCRIPTION OF THE PREFERRED EMBODIMENT

Figure 1:
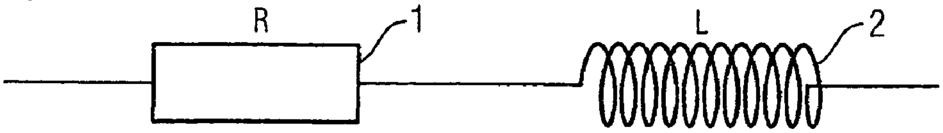
FIG 1 PRIOR ART
FIG. 1 is a circuit diagram of an RL combination according to the related art, in the form of a series circuit formed by a low-loss coil, and a resistance.

Reference will now be made in detail to the preferred embodiments, examples of which are illustrated in the accompanying drawings, wherein like reference numerals refer to like elements throughout.

In FIG. 1, 1 denotes a resistance element with a resistance R, and 2 denotes a coil element with an inductance L. RL combinations such as these are known in a suitable form from the related art.

Figure 2:
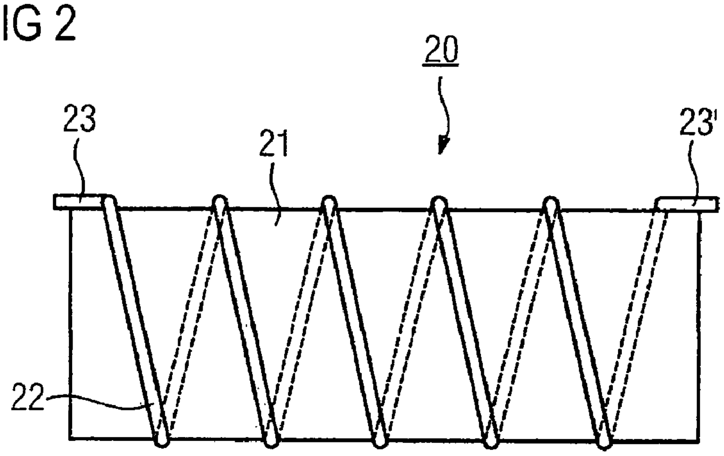
FIGS. 2 and 2A are side and section views of a cylindrical coil composed of tube material.
Figure 2A:
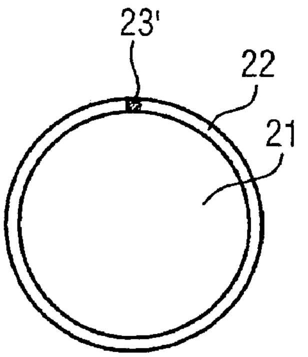

In FIG. 2, there is a mount 21 on which a tube material 22 is wound circumferentially as a spiral. The mount 21 is used to fix the tube. The mount 21 may also be omitted, if required. Connections 23 and 23' are provided at the two ends.

Figure 3:
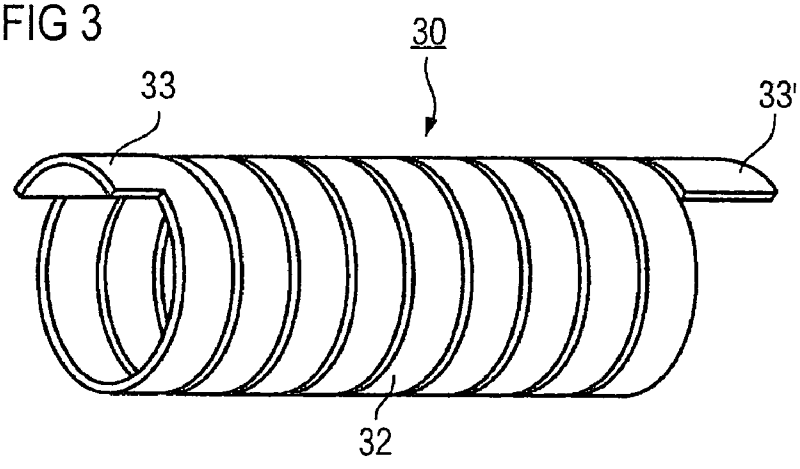
FIGS. 3 and 3A are perspective and end views of a cylindrical coil composed of strip material.
Figure 3A:
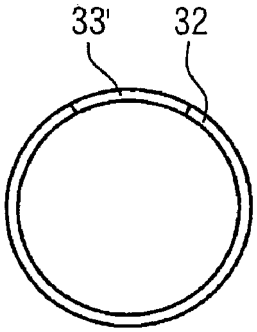

In FIG. 3, a strip conductor material 22 is wound to form a cylindrical coil 30. No mount is shown in this case. The connections at the two ends are annotated 33 and 33'.

Figure 4:
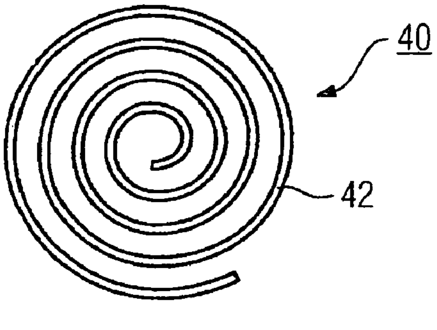
FIG. 4 is a plan view of a spiral coil composed of tube or strip conductor material.
Figure 5:
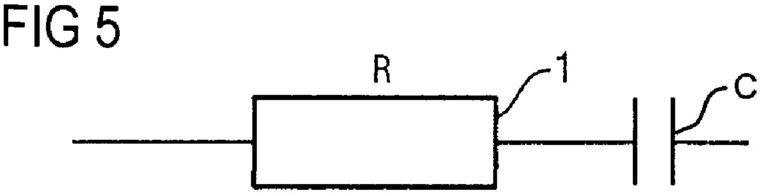
FIG. 5 is a circuit diagram of an RC combination according to the invention.

In FIG. 4, a spiral coil 40 is formed from a material 42. The material may either be a tube material, such as the material 22 from FIG. 2, or else a strip conductor material, such as the material 32 from FIG. 3.

In the examples shown in FIGS. 2 to 4, one coil is in each case formed, with a defined inductance and a defined resistance.

In the case of pulse generators for high current amplitudes, it is advantageous to split the capacitor that is required for energy storage into a plurality of parallel-connected smaller capacitors. In this case, it is particularly advantageous for each capacitor to have an associated integrated resistance/coil combination in series with it in order on the one hand to effectively protect the individual capacitor, while on the other hand also achieving optimum balancing of the current distribution through the individual capacitors.

Furthermore, this results in the total energy in the event of a short circuit being distributed over a plurality of RL combinations, which leads to the individual resistances being cooled down more quickly because their mass is now reduced, thus allowing them to be used again more quickly. The total number of individual RL units in conjunction with the system-inherent system inductance and the self-inductances of the capacitors are in this case matched such that optimum protection is provided even for a series-connected (semiconductor) switch or for freewheeling diodes. The total mass of the RL units is chosen such that the discharge energy absorbed in the event of a short circuit does not lead to unacceptable heating of the individual elements.

Convection with the surrounding area is normally sufficient for cooling purposes. Particularly for high mean power levels, such as those which occur at relatively high pulse repetition rates, it is advantageous to provide additional forced cooling in addition to the natural convection cooling. Such forced cooling may, for example, comprise a coolant flowing through the tubular resistance element, which coolant is supplied via electrically insulated supply lines from an additional cooling circuit. Electrically poorly conductive liquids corresponding to the related art, such as deionized water, transformer oil or else various alcohols, are suitable as coolants.

The already described integration of the function of the coil and resistance represents a particularly advantageous, space-saving problem solution since only a single component is now required and, in addition, there is no need for the isolation separations required for the second component.

Apart from the latter, the reliability of the overall arrangement is improved. In particular a considerably smaller number of components and electrical connections are now required in the complex appliances which are provided for production of high-current, high-power pulses, and which have passive components, such as capacitors, and/or switching elements, such as semiconductor switches, diodes or the like.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. An arrangement for protection of electronic components in appliances producing high-current, high-power pulses and having passive components, comprising:

a component having a series resistance with a preset resistance value and a preset series inductance value, formed as a coil from a non-magnetic, alloyed stainless steel having an electrical resistivity with a high temperature coefficient, whereby the series resistance is dependent on temperature and upon occurrence of a short circuit the series resistance has a heated resistance value larger than the preset resistance value, and having a thermal capacity that allows a preset amount of energy to be consumed by said component without electrical resistivity of the material in the coil causing the series resistance to exceed the preset resistance value by a predetermined amount.

2. The arrangement as claimed in claim 1, wherein the coil is formed by winding a tube having walls with a thickness less than one-quarter of the diameter of the tube, composed of a metallic material having a conductivity that produces the preset resistance value.

3. The arrangement as claimed in claim 1 wherein the coil is formed by winding a strip composed of a metallic material having a conductivity that produces the preset resistance value.

4. The arrangement as claimed in claim 1, wherein the coil is formed by winding at least one of a strip having a thickness to width ratio no greater than 1:4 and a tube having walls with a thickness less than one-quarter of the diameter of the tube.

5. The arrangement as claimed in claim 4, wherein the coil is a spiral coil.

6. The arrangement as claimed in claim 5, further comprising a mechanical attachment to the coil, absorbing radially and axially acting forces.

* * * * *